(12) United States Patent
Mikulec

(10) Patent No.: US 7,997,858 B2
(45) Date of Patent: Aug. 16, 2011

(54) ARRANGEMENT FOR SEALING OFF A GAP BETWEEN A FIRST COMPONENT AND A SECOND COMPONENT

(75) Inventor: Vinko Mikulec, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 1034 days.

(21) Appl. No.: 11/793,859

(22) PCT Filed: Sep. 30, 2005

(86) PCT No.: PCT/EP2005/054952
§ 371 (c)(1),
(2), (4) Date: Jun. 21, 2007

(87) PCT Pub. No.: WO2006/069817
PCT Pub. Date: Jul. 6, 2006

(65) Prior Publication Data
US 2008/0008579 A1    Jan. 10, 2008

(30) Foreign Application Priority Data
Dec. 23, 2004    (EP) .................................... 04030733

(51) Int. Cl.
*F04D 29/10*    (2006.01)
(52) U.S. Cl. .................... 415/174.3; 415/231; 277/411; 277/413; 277/421; 277/581; 277/587
(58) Field of Classification Search .................. 277/355, 277/411, 412, 421, 581, 587; 415/110, 170.1, 415/174.1, 174.2, 174.3, 229, 230, 231; 416/174
See application file for complete search history.

(56) References Cited

U.S. PATENT DOCUMENTS

| | | | |
|---|---|---|---|
| 1,932,214 A * | 10/1933 | Hornschuch | .................. 277/425 |
| 2,119,033 A | 5/1938 | Andrew | |
| 5,171,022 A | 12/1992 | Fessmann | |
| 2001/0007632 A1 | 7/2001 | Pesek et al. | |
| 2004/0100035 A1 | 5/2004 | Turnquist et al. | |

FOREIGN PATENT DOCUMENTS

| | | |
|---|---|---|
| DE | 26 37 028 A1 | 2/1978 |
| DE | 4107586 C1 | 8/1992 |
| JP | 4117925 | 8/1941 |
| JP | 55082862 A | 6/1980 |
| JP | 61241522 A | 10/1986 |
| WO | WO 2004/053365 A1 | 6/2004 |

* cited by examiner

*Primary Examiner* — Justine R Yu
*Assistant Examiner* — Ryan H Ellis

(57) ABSTRACT

The invention relates to a device for sealing the space between first and second components, wherein a sealing element is placed between the sealing surface of the first component and the sealing surface of the second component, means are used for displacing the sealing element towards the first component and the sealing surface of the second component is used in the form of a guiding surface for the sealing element when it is displaced towards the first component. The means comprise a movable pressure element which is embodied in such a way that the displacement thereof generates the displacement of the sealing element.

16 Claims, 2 Drawing Sheets

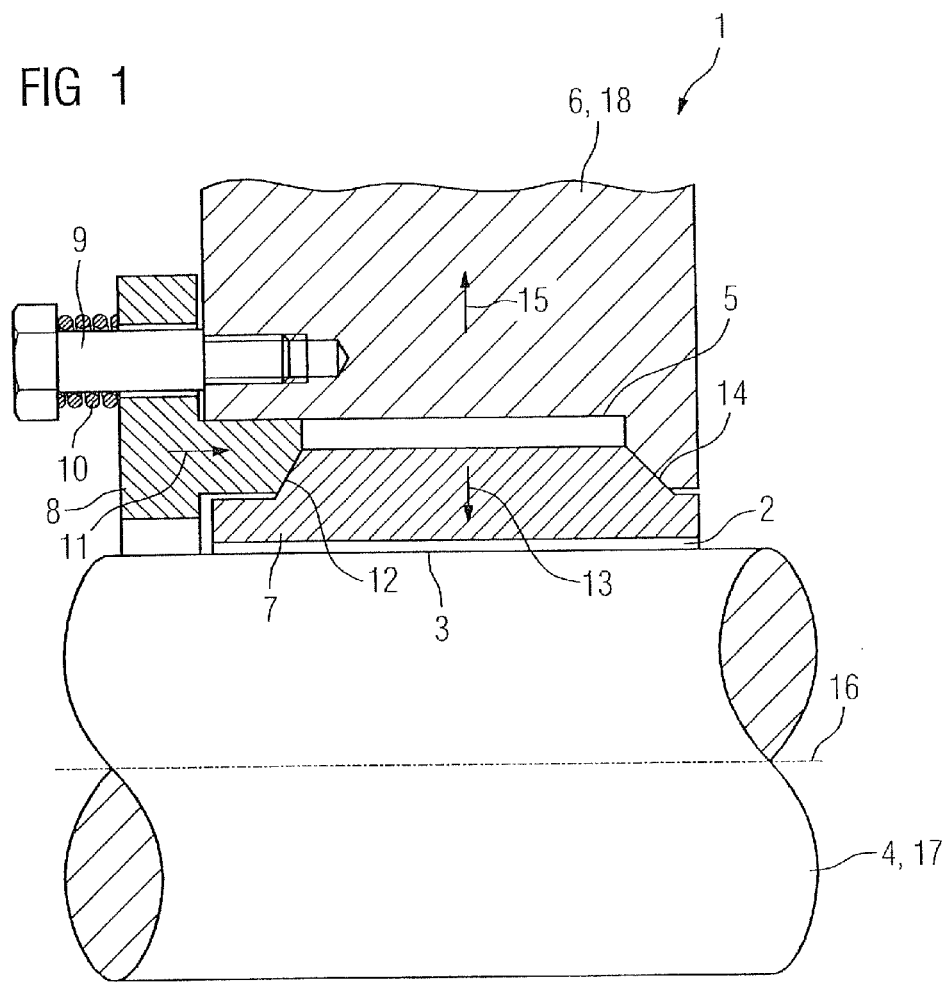

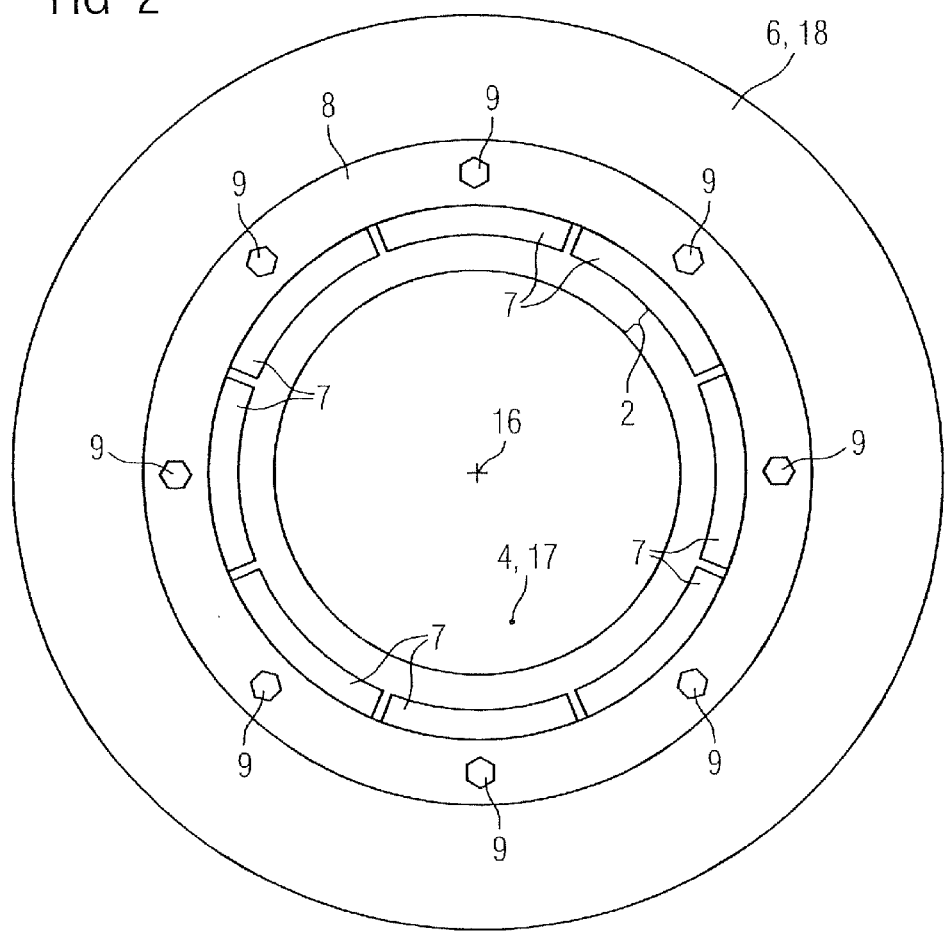

ARRANGEMENT FOR SEALING OFF A GAP BETWEEN A FIRST COMPONENT AND A SECOND COMPONENT

CROSS REFERENCE TO RELATED APPLICATIONS

This application is the US National Stage of International Application No. PCT/EP2005/054952, filed Sep. 30, 2005 and claims the benefit thereof. The International Application claims the benefits of European application No. 04030733.2 filed Dec. 23, 2004, both of the applications are incorporated by reference herein in their entirety.

FIELD OF INVENTION

The invention relates to an arrangement for sealing off a gap between a first component and a second component, a sealing element being arranged between a sealing face of the first component and a sealing face of the second component. The invention relates, furthermore, to a use of the arrangement in a turbomachine.

BACKGROUND OF THE INVENTION

Known shaft seals are, for example, labyrinth seals. A leakage flow is in this case braked by what are known as sealing lips. Seals of this type are employed in various turbomachines.

The collective designation "turbomachine" embraces water turbines, steam and gas turbines, wind wheels, centrifugal pumps and centrifugal compressors and also propellers. All these machines have in common the fact that they serve the purpose of extracting energy from a fluid in order thereby to drive another machine or, conversely, to supply energy to a fluid in order to increase its pressure. A fluid is to be understood as meaning both liquids and gases which can execute flowing movements.

As in other thermal turbomachines, the shaft seals through the casing and the inner sealing points of the machines are conventionally sealed off by means of labyrinth seals. In the case of combustible, toxic or costly gases, however, it is necessary to have with respect to the surroundings a complete gastight closure which cannot be achieved by means of the labyrinth seals.

This may be remedied by floating ring seals or seals with a liquid barrier. In such arrangements, sealing off takes place by means of a liquid film between a shaft and the bore of sealing rings which are secured against rotation, but can move in the radial direction, so that they can follow the displacements of the shaft with respect to the casing. The barrier liquid is supplied between two rings and emerges on the gas and atmosphere side. Oils and water are primarily considered as barrier liquids. Selection must take into account the variations which the liquid may experience due to dissolved gases, such as foaming, viscosity changes or chemical reactions.

Of course, the sealing action is the better, the narrower the gap between the rotor and the stator is. It is desirable that such sealing arrangements be designed in such a way that an easy mountability of the overall turbomachine can be carried out. Furthermore, it is necessary to ensure that the rotor is rotatable in the stator under all operating conditions. The markedness of an undesirable gap between a stator and a rotor is influenced by centrifugal forces and pressure differences and also different expansions of the rotor and stator on account of high temperature fluctuations.

Seals in which a sealing action is achieved by means of barrier gas are known. High barrier gas consumptions sometimes have to be allowed for in order to ensure a good sealing action. Moreover, seals are known in which there is contact between the stator and the rotor. Brush seals, as they are known, whose sealing action is afforded even in the case of varying gap widths, are known in this context.

SUMMARY OF INVENTION

An object of the invention is to specify an arrangement for sealing off a gap between a first component and a second component, in which the gap is as small as possible for all operating conditions.

The object is achieved by means of an arrangement for sealing off a gap between a first component and a second component, a sealing element being arranged between a sealing face of the first component and a sealing face of the second component, means being provided which are designed to displace the sealing element toward the first component, the sealing face of the second component being arranged as a guide face for the sealing element during displacement toward the first component, the means comprising a movable pressure element which is designed in such a way that its displacement leads to a displacement of the sealing element, the pressure element having a first face which is inclined with respect to a movement direction of the sealing element and which bears against a second inclined face of the sealing element, the pressure element being arranged on the second component by means of a screw having a spring, for the resilient mounting of the pressure element.

The advantage of the invention is, inter alia, that the gap between the first component and the second component can be kept essentially constant over a wide temperature range. When temperatures become higher, the first component and the second component often expand to a different extent. This would result in a gap becoming larger. By virtue of the invention, a sealing element is employed, with the result that the gap becomes smaller again as a result of a displacement of a sealing element.

One advantage, inter alia, is that thermal expansion occurring in a radial direction is converted into an axial movement.

A movement of the first component which has taken place due to thermal expansion leads in this case to a movement of the movable pressure element. The movement is in this case such that this leads to a movement or displacement of the sealing element in the direction of the gap.

This affords a suitable and at the same time simple means for counteracting a thermally induced movement.

A displacement of, the pressure element leading in one movement direction is deflected, as it were, via a common inclined face into another movement direction. Inclined faces must in this case have a suitable angle.

This affords a simple possibility of converting movements in one direction into a movement in another direction via suitable faces and some sliding friction.

By virtue of the arrangement, it is possible as far as possible to relieve the pressure element of external forces. As a result of changing temperatures, the gap between the first and the second component changes. An enlargement of the gap leads to a movement of the pressure element as a consequence of a spring force. Finally, the movement of the pressure element leads to a movement of the sealing element in the direction of the gap.

The arrangement affords a possibility of implementing a movement in a movement direction via a simple spring force.

In an advantageous design, the movement direction of the pressure element lies essentially perpendicularly to the movement direction of the sealing element.

The advantage, in this case, is that construction space is saved due to a virtually orthogonal conversion of movement directions.

In a further advantageous design, the first component is designed as a rotationally symmetrical rotor mounted rotatably about an axis of rotation, and the second component as a stator designed to be rotationally symmetrical about the axis of rotation.

The arrangement for sealing off the gap is suitable precisely for a gap between a rotor and a stator.

In a further advantageous design, the sealing element is formed from a plurality of individual sealing elements arranged around the rotor.

This affords the possibility of covering a greater gap width along the rotor axis. An increasing gap leads to an increased circumferential length of the sealing element. A reduction in the gap leads to a reduction in the circumference of the sealing element. A sealing element designed as a ring would therefore have a minimal diameter. By the sealing element being divided into individual sealing elements which are arranged around the rotor, it is possible to provide a variable circumference.

In a further advantageous design, the pressure element is designed in the form of a ring around the rotor.

This arrangement is suitable for rotors in which a ring can easily be mounted around the rotor.

In a further design, the pressure element is designed in the form of at least two part rings.

This arrangement is suitable for turbomachines in which a ring cannot readily be mounted around the rotor. By the overall ring being divided into at least two part rings, these can easily be mounted.

In an advantageous design, the pressure element and the sealing element have in each case a conical face designed in such a way that a displacement of the pressure element brings about a displacement of the sealing element.

This affords a particularly simple means for implementing a conversion of movement directions. Conversion in this case takes place via purely mechanical forces which, moreover, require little construction space.

In an advantageous design, the stator and the sealing element have one of the abovementioned conical faces, for example an opposite further conical face designed in such a way that a displacement of the sealing element brings about bearing contact against the stator.

This achieves the advantage that, by a specific selection of the angles of the conical faces, the sealing element is centered. This means that a tilting of the sealing element, which would lead to a changing gap, is avoided.

The arrangement for sealing off a gap is advantageously used in a turbomachine.

BRIEF DESCRIPTION OF THE DRAWINGS

The invention is explained in more detail below with reference to, exemplary embodiments which are illustrated diagrammatically in the drawing. The same reference symbols are used throughout for the same and functionally identical components.

In the drawing:

FIG. 1 shows a section through an arrangement for sealing off a gap;

FIG. 2 shows a side view of the arrangement.

DETAILED DESCRIPTION OF INVENTION

FIG. 1 illustrates a section through an arrangement for sealing off a gap 2. A sealing element 7 is arranged between a sealing face 3 of a first component 4 and a sealing face 5 of a second component 6.

A pressure element 8 is mounted resiliently on the second component 6 via a screw 9 and a spring 10. The spring 10 generates a force in a first movement direction 11. A movement of the pressure element 8 would exert a further force on the sealing element 7 via an inclined face 12.

Finally, the movement of the pressure element 8 would lead to a displacement of the sealing element 7 in a further movement direction 13.

A further inclined face is arranged between the second component 6 and the sealing element 7. By suitable angles being selected for the first inclined face and the further inclined face 14, a nontilting movement of the sealing element 7 in the direction of the gap 2 takes place.

The spring force of the spring 10, the first oblique face 12 and the further oblique face 14 are selected in thermodynamic equilibrium in such a way that as small a gap 2 as possible is formed. In the event of a rise in temperature, the second component 6 expands in an expansion direction 15. In the case of a rigid or firm arrangement of the sealing element 7 on the second component 6, this would lead to an enlargement of the gap 2. A movement of the second component 6 in the expansion direction 15 leads to a movement of the pressure element 8 in the first movement direction 11 as a result of the spring force of the spring 10. This displacement of the pressure element 8 is such that the displacement of the latter leads to a displacement of the sealing element 7 in direction 13.

The first movement direction 12 and the direction 13 are in this case essentially perpendicular to one another.

The first component 4 may be designed as a rotationally symmetrical rotor 17 mounted rotatably about an axis of rotation 16. The second component 6 may be designed as a stator 18 designed to be rotationally symmetrical about the axis of rotation 16.

The gap 2 may be influenced by the selection of suitable materials for the sealing element 7, the pressure element 8 and the second component. The size of the gap 2 is thus dependent on the prevailing operating states.

FIG. 2 illustrates a side view of the arrangement for sealing off a gap between a rotor and a stator. In the embodiment illustrated in FIG. 2, the pressure element is designed in the form of a ring around the rotor 17. A design of the pressure element 8 also in the form of two part rings may be envisaged.

The sealing element 7 is divided into a plurality of, overall eight individual sealing elements 7 in the embodiment illustrated in FIG. 2.

In this embodiment, the pressure element 8 and the sealing element 7 are designed in such a way that they have a conical face in each case, a displacement of the pressure element 8 causing a displacement of the sealing element 7.

Furthermore, in this embodiment, the stator 18 and the sealing element 7 have a further conical face which is designed in such a way that a displacement of the sealing element 7 causes bearing contact against the stator 18.

The invention claimed is:

1. An arrangement for sealing a gap between a first component and a second component, comprising:
   a sealing element arranged between a sealing face of the first component and a sealing face of the second component; and
   a sealing element displacement device designed to displace the sealing element toward the first component where the sealing face of the second component is arranged as a guide face for the sealing element during displacement toward the first component, the sealing element displacement device having:
      a movable pressure element having a first face which is inclined with respect to a movement direction of the sealing element and which bears against a second inclined face of the sealing element, and in that the pressure element is arranged on the second component via a screw having a spring, for the resilient mounting of the pressure element, wherein the movable pressure element is designed such that displacement of the pressure element leads to a displacement of the sealing element.

2. The arrangement as claimed in claim 1, wherein the movement direction of the pressure element lies essentially perpendicularly to a movement direction of the sealing element.

3. The arrangement as claimed in claim 2, wherein the first component is designed as a rotationally symmetrical rotor mounted rotatably about an axis of rotation, and the second component as a stator designed to be rotationally symmetrical about the axis of rotation.

4. The arrangement as claimed in claim 3, wherein the sealing element is formed from a plurality of individual sealing elements arranged around the rotor.

5. The arrangement as claimed in claim 3, wherein the pressure element is formed as a ring around the rotor.

6. The arrangement as claimed in claim 5, wherein the pressure element and the sealing element each have a conical face designed such that a displacement of the pressure element causes a displacement of the sealing element.

7. The arrangement as claimed in claim 3, wherein the pressure element comprises a plurality of part rings.

8. The arrangement as claimed in claim 7, wherein the stator and the sealing element have a further conical face designed such that a displacement of the sealing element causes bearing contact against the stator.

9. A turbomachine, comprising:
   a rotor rotably mounted along a rotational axis of the machine;
   a stationary stator coaxially surrounding the rotor;
   a sealing element arranged between a sealing face of the rotor and a sealing face of the stator; and
   a sealing element displacement device designed to displace the sealing element toward the rotor where the sealing face of the stator is arranged as a guide face for the sealing element during displacement toward the rotor, the sealing element displacement device having:
      a movable pressure element having a first face which is inclined with respect to a movement direction of the sealing element and which bears against a second inclined face of the sealing element, and in that the pressure element is arranged on the second component via a screw having a spring for a resilient mounting of the pressure element, wherein the movable pressure element is designed such that displacement of the pressure element leads to a displacement of the sealing element.

10. The turbomachine as claimed in claim 9, wherein the movement direction of the pressure element lies essentially perpendicularly to a movement direction of the sealing element.

11. The turbomachine as claimed in claim 10, wherein the first component is designed as a rotationally symmetrical rotor mounted rotatably about an axis of rotation, and the second component as a stator designed to be rotationally symmetrical about the axis of rotation.

12. The turbomachine as claimed in claim 11, wherein the sealing element is formed from a plurality of individual sealing elements arranged around the rotor.

13. The turbomachine as claimed in claim 11, wherein the pressure element is formed as a ring around the rotor.

14. The turbomachine as claimed in claim 13, wherein the pressure element and the sealing element each have a conical face designed such that a displacement of the pressure element causes a displacement of the sealing element.

15. The turbomachine as claimed in claim 11, wherein the pressure element comprises a plurality of part rings.

16. The turbomachine as claimed in claim 15, wherein the stator and the sealing element have a further conical face designed such that a displacement of the sealing element causes bearing contact against the stator.

* * * * *